United States Patent Office 2,778,822
Patented Jan. 22, 1957

2,778,822

PHOTOGRAPHIC SENSITIZING DYES

John Charles Firestine, South River, N. J., assignor to E. I. du Pont de Nemours and Company, Wilmington, Del., a corporation of Delaware No Drawing. Application May 26, 1953,
Serial No. 357,627

11 Claims. (Cl. 260—240.4)

This invention relates to photographic sensitizing dyes. More particularly it relates to a new class of merocyanine dyes containing o-carboxyphenyl groups on the dimethine chain, and to their preparation.

There are many known merocyanine type dyes. Most of them have quite low solubility in water and they are not removed from the water-permeable colloid layers of photographic elements by the usual aqueous developing, fixing, bleaching and washing baths upon the processing of the exposed photographic elements. This is quite disadvantageous, especially in photographic papers, because small residual amounts of the merocyanine dyes produce objectionable stain and discoloration.

An object of this invention is to provide merocyanine dyes of increased solubility in water. Another object is to provide merocyanine dyes which can be removed from water-permeable colloid layers of photographic elements by aqueous processing baths. A further object is to provide merocyanine dyes with water-solubilizing groups. A still further object is to provide such dyes from available chemical compounds. Still other objects will be apparent from the following description of the invention.

The above objects are accomplished by the merocyanine dyes of this invention which have an o-carboxyphenyl group on the dimethine chain. These novel compounds, which are merocyanine dyes, can be represented by the general formula:

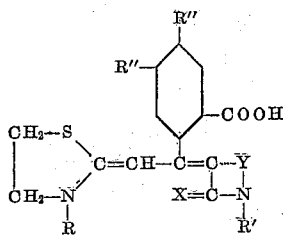

wherein X is a chalcogen taken from the group consisting of oxygen and sulfur, Y constitutes the atoms necessary to complete a 5-membered heterocyclic nucleus, R is an alkyl, or aralkyl radical, R' is an alkyl, aryl, carboxyalkyl, carboxyaryl, sulfoaryl, or aralkyl radical, and one R'' radical is hydrogen and the other is an aryl, aryloxy or alkoxy radical.

In the foregoing formula, suitable alkyl radicals R and R' include methyl, ethyl, propyl, and n-butyl. Suitable aralkyl radicals include benzyl, phenylethyl and naphthylmethyl. The useful aryl radicals include phenyl and naphthyl, the useful aryloxy radicals include phenoxy and naphthoxy, the useful alkoxy radicals include methoxy, ethoxy, propoxy, and butoxy. Among the carboxyalkyl, carboxyaryl and sulfoaryl radicals which can be used are carboxyethyl and carboxypropyl, carboxyphenyl, carboxynaphthyl, sulfophenyl, and sulfonaphthyl.

Exemplary 5-membered heterocyclic nitrogen nuclei of which Y constitutes a part are rhodanic acid and derivatives, hydantoins, thiohydantoins, pyrazolones, thiopyrazolones, and 2-thio-4-keto-tetrahydrooxazoles.

The compounds of the foregoing formula are good photographic spectral sensitizers. They are particularly useful as orthochromatic or green sensitizers for silver chlorobromide, silver bromide and silver iodobromide colloid emulsions, especially gelatino silver halide emulsions.

Compounds of the above formula, which are merocyanine dyes, can be made advantageously by reacting a 2-methylthiazoline quaternary salt with a heterocyclic ketomethylene base having an intracyclic reactive methylene group and phthalic anhydride or a 4-aryl-, 4-alkoxy-, or 4-aryloxy-phthalic anhydride, in about equimolecular proportions, in the presence of a basic condensing agent while heating to an elevated temperature below the decomposition point of the reactants, preferably under conditions of reflux. The quaternary salt may be preformed or formed in situ by admixing the heterocyclic nitrogen base and an alkyl or aralkyl quaternizing salt, e. g., dimethyl sulfate, methyl p-toluene sulfonate or ethyl p-toluene sulfonate, benzyl chloride, benzyl bromide, and ethyl perchlorate with the ketomethylene base and phthalic anhydride.

Suitable basic condensing agents for the reaction include pyridine, piperidine, triethylamine, tripropylamine, methyl diethylamine, dimethylaniline and alkali metal salts of organic acids, e. g., sodium acetate.

Silver halide emulsions containing the dyes which form an important aspect of the invention may be prepared in various manners. They may be incorporated in the emulsion before it is coated on a support or alternatively the support (e. g., a plate or paper or film) coated with the emulsion may be bathed in a solution containing one or more of the compounds.

The actual quantity of the compound incorporated in the emulsion will vary to a certain extent with the individual compounds, and with the ultimate effect which it is desired to obtain. As an indication of the order of the quantities employed 60–100 cc. of a one in one thousand solution of the dye may be incorporated in six and a half litres of emulsion equivalent to about two hundred and fifty grams of silver nitrate, or the coated support may be bathed in a one in one thousand solution of the compound or an even more dilute solution. The strength of the solution may vary according to the dye used and may be as low as one in ten thousand.

Various types of silver halide emulsions are benefited by the treatment, including simple and mixed emulsions, e. g., silver chloride, silver bromide, silver chlorobromide, silver iodobromide, and silver chlorobromo iodo emulsions. Various water-permeable colloids can be used to bind the silver halides, e. g., gelatin, albumin, agar agar, hydrophilic polyvinyl acetals, including polyvinyl acetal color formers, hydrophilic cellulose esters and ethers, hydrophilic polyamides, etc. The compounds are readily removed by the processing baths used in normal processing of films to image records. This is of considerable importance in multilayer elements wherein the sensitizers are not close to the surface of an emulsion.

The invention will be further illustrated but is not intended to be limited by the following examples.

EXAMPLE I

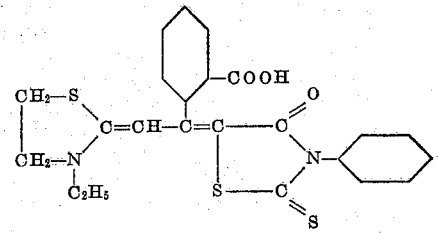

In a 250 ml. Erlenmeyer flask equipped with a reflux condenser were placed 5.14 grams of 2-methylthiazoline ethiodide, 4.18 grams of N-phenylrhodanine, 40 mls. of dry pyridine, and 15 grams of phthalic anhydride. The mixture was heated under reflux for three minutes during which time a deep orange color formed. It was then diluted with water until the solution developed a cloudiness. The dye, which had the above formula, separated as an orange red solid and, after cooling well, it was separated by filtration and washed with a small amount of acetone. The dye was recrystallized from acetone to yield 2.8 grams of red crystals melting at 232–233° C.

Analysis calcd. for $C_2H_2ON_2O_3S_3$: C, 58.9; H, 4.27; N, 5.94. Found: C, 58.9; H, 4.29; N, 5.86.

An acetone solution of this dye had an absorption maximum at 500 millimicrons and when added to a gelatin silver chlorobromide emulsion extended the sensitivity to 600 millimicrons with a peak at 555 millimicrons.

EXAMPLE II

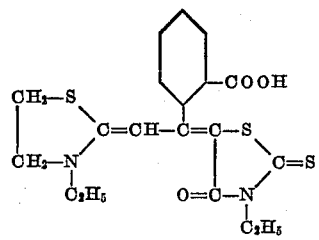

In a 250 ml. Erlenmeyer flask fitted with a reflux condenser were placed 5.14 grams (.02 mole) of 2-methylthiazoline ethiodide, 3.22 grams (.02 mole) N-ethylrhodanine, 40 ml. of dry pyridine and 15 grams of phthalic anhydride. The mixture was heated under reflux for three minutes with the formation of a deep orange red color. The mixture was diluted to 1 liter with water whereupon the dye precipitated. The dye, which had the above formula, was separated by filtration, washed with water, then ethanol and then recrystallized twice from ethanol. The yield of dye was 1.32 grams of red crystals (11%) having a melting point of 218–220° C.

Analysis calcd. for $C_{19}H_2ON_2O_3S_3$: C, 54.3; H, 4.77; N, 6.68. Found C, 53.86; H, 4.98; N, 6.88.

The absorption peak for this dye was at 507 m$\mu$ and it sensitized a gelatin silver chlorobromide emulsion out to 585 m$\mu$ with its peak at 550 m$\mu$.

EXAMPLE III

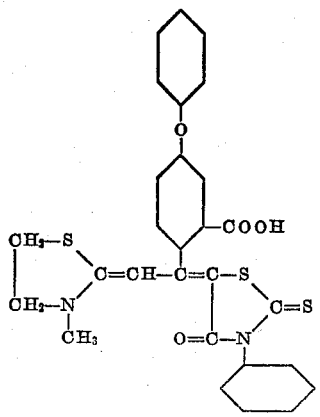

In a 250 ml. Erlenmeyer flask fitted with a reflux condenser were placed 2.43 grams (.01 mole) of 2-methylthiazoline methiodide, 2.9 grams (.01 mole) of N-phenylrhodanine, 20 ml. of pyridine, 7.5 grams of 4-phenoxyphthalic anhydride, and 1 ml. of triethylamine. The mixture was heated under reflux for one minute with the formation of a red color. The solution was then diluted to 1 liter with water and acidified with glacial acetic acid whereupon the crude dye separated. The water was decanted from the crude dye which was dissolved in 200 ml. of a 50% acetone/methanol mixture with enough 5% aqueous sodium carbonate to dissolve the dye. The solution was then acidified with glacial acetic acid to precipitate the incompletely purified dye as an orange red solid. This dye was separated by filtration and further purified by dissolving it in 125 ml. of boiling benzene and diluting the solution with 50 ml. of hexene to precipitate a tarry product. The tarry product was separated by filtration and a second portion of 150 ml. of hexane added to the filtrate whereupon an orange dye of the above formula separated. The benzene-hexane purification was repeated. The yield of dye was 0.31 gram of orange powder having a melting point at 123° C. (with decomposition). The absorption peak in ethanol was at 504 m$\mu$ and it extended the sensitivity of a gelatin silver chloride emulsion to 580 m$\mu$ with its sensitizing peak at 550 m$\mu$.

EXAMPLE IV

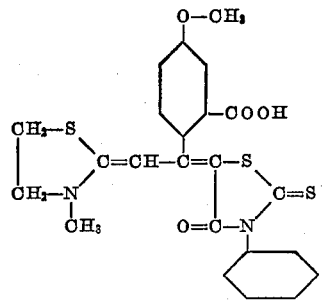

In a 250 ml. Erlenmeyer flask fitted with a reflux condenser there were placed 2.43 grams (.01 mole) of 2-methylthiazoline methiodide, 2.9 grams (.01 mole) of phenylrhodanine, 20 ml. of dry pyridine and 1 ml. of triethylamine and 7.5 grams of 4-methoxyphthalic anhydride. The mixture was boiled for one minute with the formation of an orange red color, then diluted to one liter with water and the product treated in the same manner as the dye of Example III. The yield of dye was 0.19 gram of orange powder having a melting point at 215° C. The absorption peak of this dye in ethanol was at 506 m$\mu$ and it extended the sensitivity of a silver gelatin silver chlorobromide emulsion to 590 m$\mu$ with its sensitizing peak at 540 to 560 m$\mu$.

EXAMPLE V

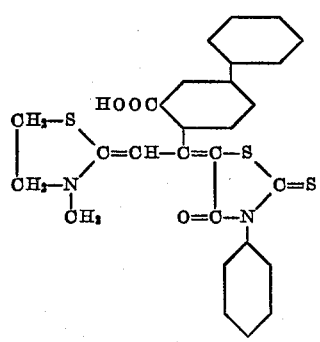

In a 250 ml. Erlenmeyer flask fitted with a reflux condenser were placed 2.43 grams (0.01 mole) 2-methylthiazoline methiodide, 2.9 grams (0.01 mole) phenylrhodanine, 20 ml. of pyridine, 7.5 grams 4-phenylphthalic anhydride, and 1 ml. of triethylamine. The mixture was boiled for one minute during which time a deep orange red color formed. The solution was then diluted with 500 ml. of water and the product treated in the same manner as the dye of Example III. The yield of dye, which had the above formula, was .115 gram orange powder with a melting point at 175° C. with decomposition. The absorption peak of this dye in ethanol was at 598 m$\mu$ and it extended the sensitivity of a gelatin silver chlorobromide emulsion to 585 m$\mu$ with its sensitizing peak at 545 m$\mu$.

In place of the specific heterocyclic ketomethylene reactants of the foregoing examples there may be substituted in equivalent amount various other compounds of this kind. Suitable additional compounds include N-methyl - 2 - thio - 4 - ketotetrahydro - oxazole, N - ethyl-2 - thio - 4 - ketotetrahydro - oxazole, N - methyl - rhodanine, N - ethyl - rhodanine, N - phenyl - rhodanine, N-benzylrhodanine, N - carboxyphenylrhodanine; barbituric acid, thiobarbituric acid, 1 - phenyl - 3 - methyl - 5 - pyrazolone, 1,3 - diphenyl - 5 - pyrazolone, N - methyl hydantoin, and N-methyl thiohydantoin.

An advantage of the invention is that it provides a new class of merocyanine dyes. A further advantage is that the dyes are good photographic sensitizers. They are very useful in photographic papers because they are readily removed in the aqueous processing baths and washing water and do not leave a residual stain or discoloration. A still further advantage is that the dyes can be made from available chemicals by a simple condensation.

What is claimed is:

1. The chemical compounds of the general formula:

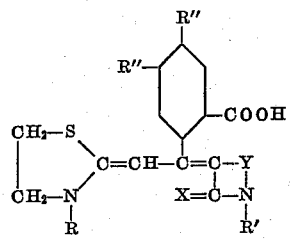

wherein X is a chalcogen taken from the group consisting of oxygen and sulfur, Y constitutes the atoms necessary to complete a 5-membered heterocyclic ketomethylene ring, R is a member taken from the group consisting of alkyl and aralkyl radicals, R' is a member taken from the group consisting of alkyl, aryl, carboxyalkyl, carboxyaryl, sulfoaryl, and aralkyl radicals, and one radical R" is hydrogen and the other is a member taken from the group consisting of hydrogen, aryl, aryloxy, and alkoxy radicals.

2. The chemical compounds of the formula:

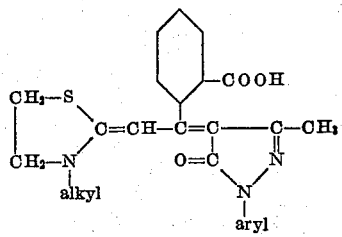

3. The chemical compounds of the formula:

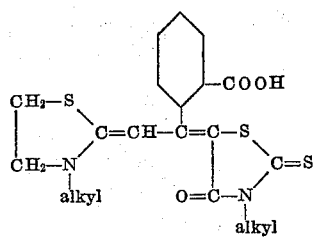

4. The chemical compounds of the formula:

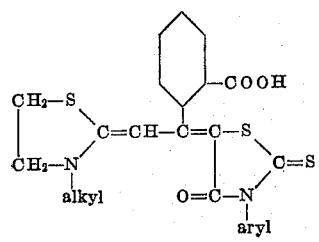

5. The compound of the formula:

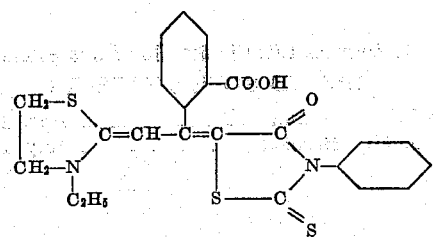

6. The compound of the formula:

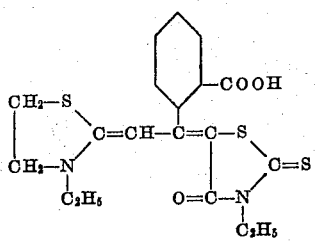

7. The compound of the formula:

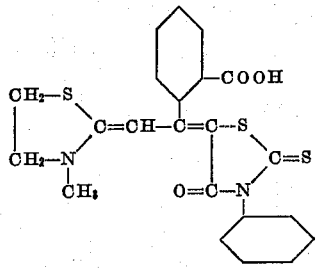

8. The compound of the formula:

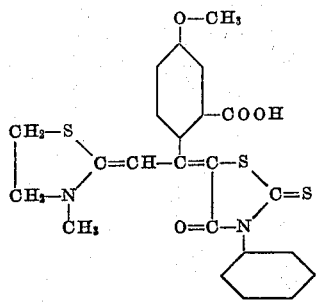

9. The compound of the formula:

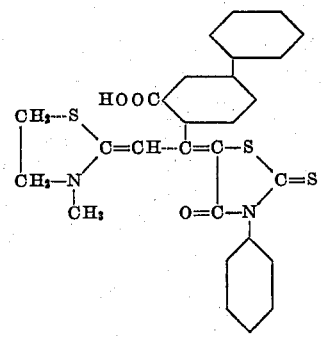

10. The process which comprises condensing a 2-methylthiazoline quaternary salt taken from the group consisting of alkyl and aralkyl quaternizing salts with a phthalic anhydride taken from the group consisting of phthalic anhydride, 4-aryl-, 4-alkyl-, 4-alkoxy- and 4-aryloxy-phthalic anhydride and a 5-membered heterocyclic ketomethylene base having a reactive intracyclic methylene group in the presence of a basic condensing agent under conditions of reflux.

11. A process as set forth in claim 10 wherein said salt is formed in situ from an alkyl salt and 2-methylthiazoline.

References Cited in the file of this patent

UNITED STATES PATENTS

| | | |
|---|---|---|
| 2,078,233 | Brooker | Apr. 27, 1937 |
| 2,165,338 | Brooker | July 11, 1939 |
| 2,170,803 | Brooker | Aug. 29, 1939 |
| 2,170,804 | Brooker | Aug. 29, 1939 |
| 2,430,295 | Kendall | Nov. 4, 1947 |

FOREIGN PATENTS

| | | |
|---|---|---|
| 135,440 | Australia | Nov. 1946 |